Dec. 29, 1970 J. HRDINA 3,551,107
METHOD OF AND AN APPARATUS FOR CHROMATOGRAPHICALLY
SEPARATING AMINO ACIDS MIXTURES
Filed April 15, 1968

JIRI HRDINA
INVENTOR.
Attorney

United States Patent Office 3,551,107
Patented Dec. 29, 1970

3,551,107
METHOD OF AND AN APPARATUS FOR CHROMATOGRAPHICALLY SEPARATING AMINO ACIDS MIXTURES
Jiri Hrdina, Prague, Czechoslovakia, assignor to Ceskoslovenska akademie ved, Prague, Czechoslovakia
Filed Apr. 15, 1968, Ser. No. 721,455
Claims priority, application Czechoslovakia, Apr. 25, 1967, 3,003/67
Int. Cl. B01d 15/08; G01n 31/08
U.S. Cl. 23—230     3 Claims

ABSTRACT OF THE DISCLOSURE

A method of and an apparatus for chromatographically separating amino acid mixtures, and more particularly of separating the amino acid pair of tyrosine-phenylalanine, provides one or a plurality of chromatographic columns, wherein at first both acidic and neutral amino acids are eluted by one or preferably more citrate buffers until the elution of the amino acid of leucine, and thereafter the amino acid pair of tyrosine-phenylanine is eluted by another buffer of which the pH-value of the normality are increased by leaps relative to the respective values of the firstmentioned buffer. The set of chromatographic columns is fed from a plurality of eluent reservoirs by means of a pump drawing the respective eluents selectively over a branched valve to the column and supplying it simultaneously with a specimen substance. The eluate to be evaluated is led from the column to an evaluating instrument over a capillary reactor, the evaluating instrument being fed with an evaluating agent by means of another pump withdrawing said agent from a reservoir.

BACKGROUND OF THE INVENTION

It is already known that by adding some organic solvents, especially methanol, or any other alcohol with a short carbon chain therein, such as, for instance, n-butanol, it is possible to improve the separation of the amino acid pair of theeonine-serine which has been a critical pair in chromatographic amino acid separating processes. The aforementioned admixture of organic solvents is, however, liable to change relative chromatographic positions of other amino acids than threonine-serine; some amino acid pairs are affected to such an extent that the realtive separation thereof is aggravated. Thus, for example, the adding of methanol, or other organic solvents to improve the separation of the pair threonine-serine from each other is accompanied by an aggravated separation of, e.g., the pair of glycine-alanine so that the lastmentioned pair may become critical.

Further, it is well known to add methanol to elution buffer solutions in a chromatographic system comprising a single column for separating amino acid mixtures from each other, which column is filled up with a polystyrene cation exchanger, and eluted with a buffer solution having a continuously variable composition. The change in the elution buffer composition is ensured by a hydrostatic mixing device. The aforementioned undesirable effect of the alcohol admixture upon the amino acid pair of glycine-alanine, or, perhaps, on other amino acid pairs is, apart from a positive effect on the separation of the amino acid pair of threonine-serine, manifested undesirably as soon as the threonine-serine pair has been excluded from the column; nevertheless the separation of other amino acids, including the glycine-alanine pair, proceeding on the column after the threonine-serine pair has been excluded therefrom, is influenced by a certain alcohol admixture concentration. Moreover, the undesirable effect of the alcohol admixture resides in that the latter is, in certain concentration, present in ion exchanger grains even after the elution buffer solution has stopped contributing to or maintaining the alcohol admixture concentration in the ion exchanger grains. Even though the alcohol admixture is only contained in the first, or in a number of beginning chambers of the hydrostatic mixer on starting the chromatographic process. I must admit that by using such known process it is possible to attain the maximum positive effect upon the threonine-serine pair on the start of the elution, but in further course of the chromatographic reaction this effect is undesirable, since the hydrostatic mixing device does not enable a steep decrease gradient of the alcohol admixture concentration up to the zero value during the elution. Thus, the hydrostatic mixing devices do not limit the alcohol admixture effect strictly to the starting chromatogram phases, wherein said admixture cannot undesirably affect the other amino acids, especially the glycine-alanine pair, etc.

The purpose of the present invention and the basic object of the same is to overcome the aforementioned disadvantages and to significantly improve the chromatographic separation of amino acid mixtures.

SUMMARY OF THE INVENTION

In accordance with one feature of my invention I provide a method of chromatographically separating amino acid mixtures, which comprises first the eluting of both acidic and neutral amino acids by one, or preferably more citrate buffers, up to the elution of leucine, and secondly the eluting of the amino acid pair tyrosine-phenylalanine by another buffer, the pH value and the normality of which are increased by leaps, i.e., by rapid or sharp transitions relative to the respective values of the first mentioned buffer.

An apparatus for carrying out the method according to the present invention comprises one or more chromatographic columns. The upper seal of the vertical chromatographic column is connected to the outlet portion of a pump, of which the inlet portion communicates in turn via a pipe with a branched or multi-way valve. Said branched valve is provided with inlet necks circumferentially arranged and connected to an eluent reservoir as well as to a vessel containing a specimen substance to be evaluated, respectively. The lowermost part of the chromatographic column communicates via capillary reactor with an evaluating device. The pipe connecting the lowermost part of the chromatographic column to the capillary reactor is, before having reached the reactor, branched to another pump to withdraw an evaluating agent from a reservoir. The branched or multi-way valve can moreover be provided with a plurality of necks connected to other eluent reservoir, respectively.

It is to be understood that the supplying period of an organic solvent admixture is not limited to the duration of the chromatographic process, but it can preferably precede the start of the latter; thus the admixture can be supplied before the specimen substance to be chromatographically separated has been carried into the column.

The effect of the enriched buffer solution before the moment or instant of carrying-in of the specimen substance is given in that there is provided a sufficient time period allowing the grains of the chromatographic charge to get saturated by diffusion before the specimen substance has been carried in. Thus the chromatographic reaction proceeds from the very beginning on said grains saturated up to a sufficient depth with the enriching alcohol admixture by which the relative chromatographic positions of the particular components are determined. In this way it is possible to attain maximum effects of said admixture upon the components having high migration speeds, and simultaneously to limit the same effect which could later undesirable affect the separation of the components having lower migration speeds, as hereinbefore explained, after all.

In cases of chromatographic separating reactions proceeding at very high rates it is possible to attain the maximum effect even if the alcohol admixture supply take place exclusively before the specimen substance has been carried in, and if the supply of the buffer free of said admixture is started in the very instant of carrying-in of the specimen substance to be chromatographically separated, or just before this instant. It results from the foregoing that the main idea of the present invention consists in that a sufficiently intensive and shortly enduring pulse of the admixture concentration is established, which pulse is capable to provoke an intensive shorttimed wave of the admixture concentration in the ion exchanger grains. The form, size and position of the concentration wave in the entire course of the chromatographic process have such a character causing positive effects on the separation of some selected amino acid pairs, an undesirable effect of said concentration wave being simultaneously reduced to a minimum acceptable in respect of the positive effect thereof on the abovementioned amino acid pair.

The necessary rapid changes in buffer quality, or the replacement of the buffers, can be, for example, cared for by a multi-way valve, programed pump, or the like.

A preferable practice of carrying out the method according to the invention consists in that the chromatographic process including the prestabilization of the column by the respective buffer solution as well as the carrying-in of the specimen substance on to the column takes place at a continuous buffer flow. To meet this requirement it is recommended to use such a column seal excluding a free space above the column charge.

In practice the method according to the present invention can for example, be carried out in that a mixture of amino acids is chromatographically separated on a pair of columns of which one is designed for the separation of both acidic and neutral amino acids while the second, a smaller one, serves for the separation of basic amino acids; the elution on the bigger column is performed in that the column is stabilized with a citrate buffer solution containing 5 percent admixture of an organic solvent, about eight minutes before the column has been fed with the specimen substance; after carrying-in the specimen substance the elution with said enriched buffer proceeds for about 13 minutes whereupon it takes place without said organic solvent admixture. After a period of 120 minutes has elapsed, i.e., when almost perfect separation of all particular components from one another has occurred, the complete analysis on both columns is carried out. It can be found out that the relative distance between threonine and serine on the resulting chromatogram, which distance usually is critically small, is now approximately as great as the distance between aspartic acid and threonine, the separation of the amino acids remaining almost perfect.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
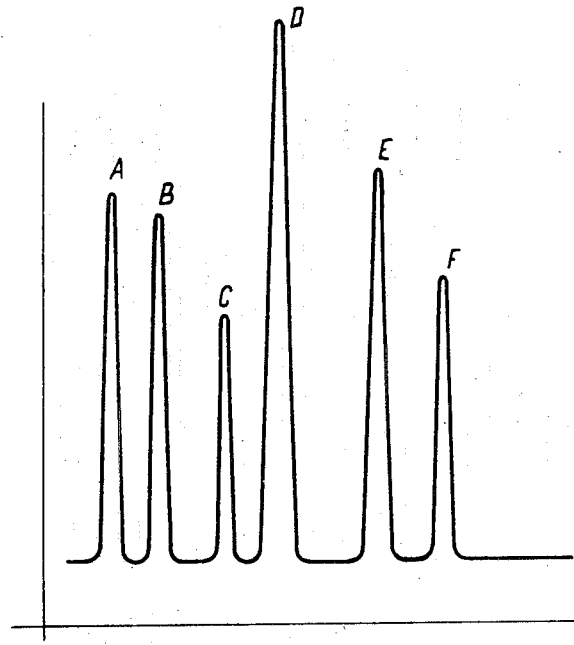
FIG. 1 shows a chromatogram involving an interval from the elution of the amino acid of valine up to the elution of the amino acid of phenylalanine.

The chromatogram in FIG. 1 is a graphical representation of a chromatographic reaction starting with the elution of the amino acid of valine, which designated by the curve peak A. Until the elution of valine is finished, a citrate buffer is supplied having pH-value of 4.25 and normality of 0.2. The chromatographic reaction then proceeds by means of a buffer of pH 5.28 and normality of 0.38, the outlet of the frontal part of the last mentioned buffer occurring between the outlets of amino acids of leucine and tyrosine (See peaks D and E, respectively), whereupon the chromatographic column is regenerated by washing with sodium hydroxide. Peak B designates the elution of methionine amino acid, peak C isoleucine amino acid and peak F phenylalanine amino acid. As results from the positions of peaks E and F, the relative separation of the amino acid pair of tyrosine-phenylalanine, which pair usually is a critical one as to the separation, is not only substantially accelerated, but also improved.

Figure 2:
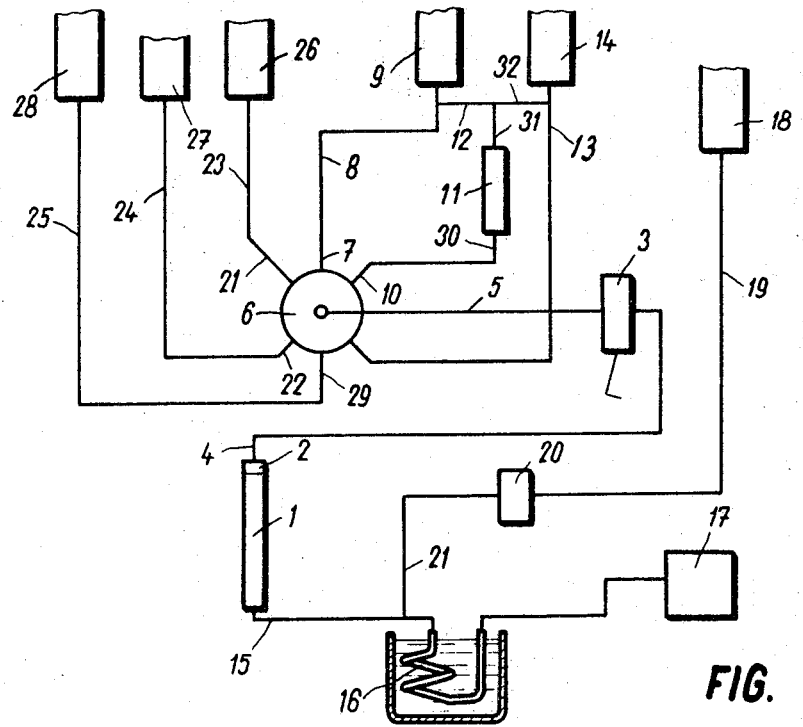
FIG. 2 is a schematic view showing a specific embodiment of an apparatus for carying out the method according to the invention.

The apparatus for carrying out the method according to the invention comprises, as shown in FIG. 2, a chromatographic column 1 the upper seal 2 of which is connected to the outlet portion of a pump 3 by means of a pipe 4. The inlet portion of the pump 3 communicates via another pipe 5 with a branched or multi-way valve 6 establishing the connection of the pipe 5 with one of circumferentially arranged necks 7, 10, 21, 22 and 29. The neck 7 is connected to an eluent reservoir 9 by the intermediary of a pipe 8. Another neck 10 is connected in turn to the one neck 30 of a vessel 11 containing the specimen substance. The other necks 21, 22 and 29 communicate via pipes 23, 24 and 25, respectively, with other eluent reservoirs 26, 27 and 28. The second neck 31 of the vessel 11 is connected via a branched pipe with pipes 12 and 32. The pipe 12 connects the vessel 11 for the specimen substance with the pipe 8 extending from the eluent reservoir 9 to the neck 7 of the branched valve 6. On the other hand, the pipe 32 communicates with a pipe 13 extending from an other eluent reservoir 14. The lowermost part of the chromatographic column 1 is connected via a pipe 15 passing a capillary reactor 16 to an evaluating instrument 17, preferably a photometer. By means of a pipe 21 the pipe 15 communicates with a pump 20 withdrawing the evaluating agent from a reservoir 18 thereof through a pipe 19.

In operation the branched or multi-way valve 6 which can be controlled manually, or automatically from a not shown program control means, establishes the connection of any one of the eluent reservoirs, 9, 14, 26, 27 and 29 with the chromatographic column 1 whereby an eluent necessary for carrying out the method of elution column chromatography of amino acid mixtures according to the invention may be selected. By the intermediary of said branched valve 6 the vessel 11 for the specimen substance is simultaneously connected to the chromatographic column 1.

The described branched valve 6 can preferably be replaced by a pump supplying the eluents into the chromatographic column according to a predetermined program control.

In order to obtain a continuous flow of the eluents and of the specimen substance into the chromatographic column 1 a free space adjacent the upper seal 2 thereof has to be avoided.

When separating the eluate flow in the capillary reactor into individual sections by means of bubble pistons it is possible to attain, e.g., in an analytical process within a period of 45 minutes, a practically complete separation of the amino acid pair of threonine-serine as well as other amino acid pairs from each other if musing the method according to the invention in that a buffer solution enriched with 6 percent of an organic solvent is supplied to stabilize the columns for a period of 2½ hours before carrying-in the specimen substance, and for a period of 8 minutes after the specimen substance has been carried in.

While the invention has been illustrated and described as embodied in a method and apparatus for chromatographically separating amino acid mixtures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art clearly constitute essential characteristics of the generic and specific aspects of this invention and therefore, such adaptations should and are intended to be comprehended within the meaning and range of equivalence of the following claims.

What is claimed as new and desired to be protected by Letters Patent is:

1. A method for the chromatographic separation of amino acid mixtures by means of column chromatography, which method comprises the steps of:
    (a) introducing onto the column an amino acid mixture including leucine, tyrosine and phenylalanine,
    (b) eluting the amino acid mixture with a first buffer until the elution of leucine, and
    (c) eluting the amino acid with a second buffer at least until elution of tyrosine and phenylalanine, the pH-value and normality of the second buffer increased by leaps relative to the respective values of the first buffer.

2. The method of claim 1 wherein the increase by leaps is effected by rapidly changing the feed of buffer to the column from the first buffer to the second buffer having the increased pH-value and normality.

3. A method for the chromatographic separation of amino acid mixtures by means of column chromatography, which method comprises the steps of:
    (a) introducing onto the column an amino acid mixture including valine, leucine, tyrosine and phenylalanine,
    (b) eluting the amino acid mixture with a first citrate buffer until the elution of valine,
    (c) introducing onto the column a second buffer, the second buffer having an increased pH-value and normality relative to the respective values of the first buffer and the column being rapidly changed to the second buffer is established in the column,
    (d) eluting the amino acid mixture until at least the elution of phenylalanine whereby the outlet from the column of the frontal part of the second buffer occurs between the outlets from the column of leucine and tyrosine,
    (e) evaluating the chromatographically separated amino acids, and
    (f) regenerating the column.

References Cited

UNITED STATES PATENTS

| | | | |
|---|---|---|---|
| 3,334,969 | 8/1967 | Catravas | 23—253X |
| 3,373,872 | 3/1968 | Hrdina | 23—253UX |
| 3,446,598 | 5/1969 | Yoder et al. | 23—230 |
| 3,458,285 | 7/1969 | Hrdina | 23—230 |
| 3,463,615 | 8/1969 | Sochor | 23—253X |

OTHER REFERENCES

Schroder, et al.: "Chromatographic Separation of Peptides on Ion Exchange Resins," Analytical Chemistry, vol. 34, No. 12, November 1962, pages 1570–1575.

MORRIS O. WOLK, Primary Examiner

R. E. SERWIN, Assistant Examiner

U.S. Cl. X.R.

23—253; 210—24; 260—112.5

PO-1050
(5/69)

UNITED STATES PATENT OFFICE
CERTIFICATE OF CORRECTION

Patent No. 3,551,107  Dated December 29, 1970

Inventor(s) JIRI HRDINA

It is certified that error appears in the above-identified patent and that said Letters Patent are hereby corrected as shown below:

IN THE CLAIMS

In claim 1, line 9, after "until" and before "elution" insert -- the -- .

In claim 3, line 13, after "second buffer" and before "is established", insert -- whereby a concentration wave of the second buffer -- .

Signed and sealed this 23rd day of March 1971.

(SEAL)
Attest:

EDWARD M. FLETCHER, JR.
Attesting Officer

WILLIAM E. SCHUYLER, JR
Commissioner of Patents